United States Patent
Hartman et al.

(10) Patent No.: US 7,123,978 B2
(45) Date of Patent: *Oct. 17, 2006

(54) METHOD FOR DYNAMICALLY TARGETING A BATCH PROCESS

(75) Inventors: Jehuda Hartman, Rehovot (IL); Oren Yulevitch, Omer, IL (US); Eyal Brill, Shoham (IL)

(73) Assignee: Insyst Ltd., Jerusalem (IL)

( * ) Notice: Subject to any disclaimer, the term of this patent is extended or adjusted under 35 U.S.C. 154(b) by 295 days.

This patent is subject to a terminal disclaimer.

(21) Appl. No.: 10/462,666

(22) Filed: Jun. 17, 2003

(65) Prior Publication Data

US 2003/0220709 A1 Nov. 27, 2003

Related U.S. Application Data

(63) Continuation-in-part of application No. 10/091,521, filed on Mar. 7, 2002, now Pat. No. 6,665,515, and a continuation-in-part of application No. 09/747,977, filed on Dec. 27, 2000, now Pat. No. 6,728,587.

(60) Provisional application No. 60/388,766, filed on Jun. 17, 2002.

(51) Int. Cl.
*G06F 19/00* (2006.01)
*G05B 13/02* (2006.01)
*G05B 11/01* (2006.01)

(52) U.S. Cl. .................... 700/108; 700/28; 700/32; 700/71; 700/121

(58) Field of Classification Search ........ 700/108–110, 700/121, 95, 28, 32, 51, 54, 71; 702/81, 702/84, 182
See application file for complete search history.

(56) References Cited

U.S. PATENT DOCUMENTS 4,970,658 A 11/1990 Durbin et al.
5,105,362 A 4/1992 Kotani (Continued)

FOREIGN PATENT DOCUMENTS

WO    WO 00/0874    6/2000

(Continued)

OTHER PUBLICATIONS

Bettoni "Constructivist Foundations of Modeling—A Kantian Perspective", Internat. Journal of Intelligent Systems, 12(8): 577-595, 1998.

*Primary Examiner*—Anthony Knight
*Assistant Examiner*—Ronald D Hartman, Jr.

(57) ABSTRACT

A method for controlling at least one characteristic of a product of an industrial batch process. The method comprising the steps of creating a hierarchical knowledge tree describing the process. Following the creation of a knowledge tree a learning process occurs. This leads to the creation of a global model. During the execution of a batch process, the global model is applied to dynamically target subsequent phase parameters based on already executed phases.

20 Claims, 15 Drawing Sheets

U.S. PATENT DOCUMENTS

| | | |
|---|---|---|
| 5,325,466 A | 6/1994 | Kornacker |
| 5,351,202 A * | 9/1994 | Kurtzberg et al. ............ 702/81 |
| 5,440,478 A | 8/1995 | Fisher et al. |
| 5,479,340 A | 12/1995 | Fox et al. |
| 5,483,468 A | 1/1996 | Chen et al. |
| 5,526,293 A * | 6/1996 | Mozumder et al. ........... 716/19 |
| 5,546,507 A | 8/1996 | Staub |
| 5,644,493 A | 7/1997 | Motai et al. |
| 5,654,903 A | 8/1997 | Reitman et al. |
| 5,691,895 A | 11/1997 | Kurtzberg et al. |
| 5,751,582 A * | 5/1998 | Saxena et al. .............. 700/109 |
| 5,761,093 A | 6/1998 | Urbish et al. |
| 5,787,425 A | 7/1998 | Bigus |
| 5,862,054 A | 1/1999 | Li |
| 5,875,285 A | 2/1999 | Chang |
| 5,896,294 A | 4/1999 | Chow |
| 5,956,251 A * | 9/1999 | Atkinson et al. ........... 700/109 |
| 6,023,146 A | 2/2000 | Casale |
| 6,073,138 A | 6/2000 | delEtraz |
| 6,134,555 A | 10/2000 | Chadha |
| 6,197,604 B1 | 3/2001 | Miller |
| 6,223,094 B1 * | 4/2001 | Muehleck et al. .......... 700/107 |
| 6,230,069 B1 | 5/2001 | Campbell et al. |
| 6,240,329 B1 | 5/2001 | Sun |
| 6,243,614 B1 * | 6/2001 | Anderson ................... 700/108 |
| 6,249,212 B1 | 6/2001 | Beigel |
| 6,263,255 B1 | 7/2001 | Tan |
| 6,301,516 B1 * | 10/2001 | Ostrowski et al. .......... 700/109 |
| 6,345,211 B1 * | 2/2002 | Yu .............................. 700/121 |
| 6,360,133 B1 | 3/2002 | Campbell et al. |
| 6,470,230 B1 | 10/2002 | Toprac et al. |
| 6,491,451 B1 * | 12/2002 | Stanley et al. .............. 396/611 |
| 6,560,503 B1 * | 5/2003 | Toprac et al. ............... 700/108 |
| 2005/0107971 A1 * | 5/2005 | Ritzdorf et al. ............... 702/84 |

FOREIGN PATENT DOCUMENTS

| | | |
|---|---|---|
| WO | WO 02/052361 | 4/2002 |

* cited by examiner

METHOD FOR DYNAMICALLY TARGETING A BATCH PROCESS

CROSS REFERENCE TO RELATED APPLICATION

This application claims the benefit of U.S. Provisional Application 60/388,766 entitled "Methods and Apparatus for Learning, Adjusting and Improving Process Outcomes in Batch System" filed on Jun. 17, 2002 which is incorporated herein by reference. This application is a continuation in part of patent application Ser. No. 09/747,977 filed Dec. 27, 2000 now U.S. Pat. No. 6,728,587 and of Ser. No. 10/091,521 filed Mar. $7^{th}$, 2002 now U.S. Pat. No. 6,665,515.

FIELD AND BACKGROUND OF THE INVENTION

This invention relates to a performance criteria in general, more particularly, to a system and method for automated process control of stages in articles manufacturing and most specifically to the integration of process control of separate manufacturing stages into a modular structure to yield a comprehensive goal oriented automated process control of the complete production line in a batch manufacturing process. This invention is also related to U.S. patent application Ser. No. 09/633,824 by Goldman, et al. entitled "Strategic Methods for Process Control" filed Aug. 7, 2000; to U.S. patent application Ser. No. 09/689,884 by Goldman, et al. entitled "System and Methods for Monitoring Process Quality Control" filed Oct. 13, 2000; and to U.S. patent application Ser. No. 09/731,978 by Goldman, et al. entitled "A Method and Tool for Data Mining in Automatic Decision Making Systems" filed Dec. 8, 2000, all of which are incorporated by reference for all purposes as if fully set forth herein.

Process control plays a fundamental role in attaining high yield of quality products. Among various process control methods, statistical process control (SPC) is well known. SPC relies on the observation of the deviation of a measurable process output parameter in the process from their statistically predicted distribution (e.g. by more than three standard deviations). SPC reveals trends towards a deterioration of a process as well as temporarily irregularities of parameters of a process.

All the aforementioned techniques suffer from inherent limitations resulting from the fact that their focus is the controlled variable, without linking the parameters, which influence the controlled variable. Thus, these techniques lack the ability to identify the combination of factors in a multi factorial process which is responsible for an observed deviation of an output of a process. Consequently, the process controlled by these methods can't be rectified on the fly, but rather can only be halted until the process engineer finds out the related problem.

To overcome this drawback, Goldman, et al in their patent application Ser. No. 09/689,884 entitled: "System and Method for Monitoring Process Quality Control" (hereinafter the POEM Application), described a method for an advanced process control (APC) which is essentially an on line monitoring and control of process parameters aimed to yield a robust process output having optimum statistical attributes (such as $C_p$ and $Cp_k$).

A modern production line comprises a great number of process stages performed in series by a diversity of manufacturing tools, thus a work piece which consist of an output of a first manufacturing tool is delivered as an input entity to a second manufacturing tool and so on until the product is finally shaped.

Furthermore, the term "manufacturing tool" represents a plurality of units performing the same process on various articles in parallel, e.g. a line of polishing machines in a microelectronic facility, each polishing one wafer at its time in accordance with the peculiar conditions of the machine, or a tool which can handle a plurality of items at once e.g. a diffusion oven which handles tens of wafers in a single run, or a plurality of inner units within a tool.

Until now, no quality control method did try to cope with the challenge that due to the "fact of life" that a production tool is not always tuned and therefore the designed nominal values of a process output carried out by this tool may vary within its tolerances in such a way that the final target will not be achieved. The present invention suggests a corrective action to be taken to "save" final target quality. This is achieved by a trade off mechanism which is based on a judicious combination of the deviating output with one or more other outputs which are deliberately diverted from their initially set target value.

Until now process control methods have been devised to control and optimize an output of a single stage in a multistage manufacturing process, and no attention was paid as to how the controlled parameters of a controlled first process affect an output of a subsequent second controlled process that follows (and functionally relies on the output of) the first stage. In addition, no attention was paid to the impact of subsequent stages output on previous stages outputs, with regard to the optimal values to be set as output targets.

The standard S88 defines hierarchical recipe management and process segmentation frameworks, which separate products from the processes that make them. The standard enables reuse and flexibility of equipment and software, and provides a structure for coordinating and integrating recipe-related information across the traditional ERP, MES, and control domains. S88 recipe control has a significant role in batch processes. Predictive control has been increasingly used in recent years in order to improve industrial processes including batch processes. There are some shortcomings to S88 that require improvement. Such improvements may lead to higher yields or higher average quality. FIG. 1 illustrates a S88 methodology in which three phases of a batch system are executed sequentially without any consideration for the results of other phases.

The S88 control recipe as it is implemented by using the SFC (or PFC) approach does not address data flow within inter-recipe execution. By looking at the SFC (or PFC) one can't tell which data item flows from where to where and what is its influence. Additionally S88 ignores inter recipe changes.

For example, the S88 does not have an in-built solution to compensate for deviations such as when at the end of a certain phase the temperature of the material is different then the target temperature. When this happens most users ignore such changes. The most popular way of dealing with changes is the golden batch approach: aping a process that leads to production of a serendipitously ideal batch.

As a result it is nowadays very difficult to have a global process control, which integrally combines all the various steps in a processes. The present invention fulfills this gap and provides other related advantages as is detailed below.

SUMMARY OF THE INVENTION

The present invention describes a method and system of a global process control, which integrally controls all the steps and stages in a process that lead a production item (e.g. a wafer in the semiconductor industry) through its voyage from raw material (a wafer) to the final product (a device).

The present invention leads to a totally different paradigm to run a production facility, where the intermediate targets for the individual machines are set dynamically during the process, in accordance with the final target for the finished product.

In accordance with the present invention there is provided a method for controlling a quality of a product of an industrial batch process comprising the steps of: (a) assigning the product a predetermined criteria with respect to a performance of the product; (b) linking the performance to a feature of at least one structural element of the product and, (c) associating the feature of at least one structural element with at least one stage in a process which forms the at least one structural element, wherein at least two process stages are modular process controlled.

In accordance with the present invention there is provided a system for controlling a quality of a product of an industrial batch process in production, that includes a plurality of processes, each process among the plurality of processes has an assigned value of target output, wherein the assigned value of target output of a first process among the plurality of processes is reassigned during the occurrence of the production in accordance to an output value of a second process among the plurality of processes, the system comprising: (a) a mechanism for monitoring of the output value of the second process; (b) a mechanism for the evaluating the output value of the second process; (c) a mechanism for reassignment a value to target output of the first process according to the evaluation of the output value of the second process and; (d) a modeler to predict a feed forward input which results with the reassigned target value having best statistical goodness.

The modeler may be an empirical modeler using empirical results or using a formula obtained from empirical results. Alternatively it may be a theoretical modeler, which is to say it uses a theoretical formula however obtained, or theoretical results or a combination thereof. As a further alternative it may use expert-provided input.

According to a further aspect of the present invention there is provided a method for controlling an overall process output, wherein the overall process includes a plurality of sub-processes, each sub-process having an assigned value of an overall process target output, the method comprising the step of: reassigning the value of the target output of a first one of said sub-process in accordance with an output of at least one second sub-process.

The process may be a manufacturing process or any other kind of process, and may include in particular interaction processes between a pharmaceutical product and a subject, either singly or in a population.

There is also provided according to the teachings of the present invention a method of improving the quality of a product of a batch process having a plurality of phases. Each phase of the batch process has inputs (some inputs being constant some variable) and outputs. Some outputs of a given preceding phase are inputs of a succeeding phase. When it is observed that an outcome of an intermediate phase which has not achieved its predetermined target is received the teachings of the present invention are applied.

Some conditions or inputs of some first phase (arbitrarily or rationally chosen) are changed, modified or adjusted so that the outputs of that first phase are changed in some way. The changed outputs are then transferred to a second succeeding phase for which these outputs are inputs. This change in conditions of the second phase changes the outputs of the downstream (succeeding) phases and ultimately of the product. Such changes are performed recursively so that ultimately the product is of the desired quality.

It is important to understand the conceptual difference between the method of the present invention and prior art methods. In prior art methods the output of each phase is set to a predetermined standard. As such, each phase is independent of the other phases. In contrast, the method of the present invention looks at the batch process holistically. Seemingly sub-standard outputs of a phase are not only allowed but tolerated or even actively sought so as to compensate for downstream processing imperfections in order to achieve improved quality of final product. The method of the present invention does not seek to produce an acceptable product made of acceptable components or acceptable intermediates. Rather, the present invention seeks to produce products with improved quality values by finding an ideal combination of acceptable or imperfect or otherwise unacceptable components and intermediates.

It is important to note that the implementation of these teachings can be performed in many ways. One way is simply through experimentation (trial and error) to yield a "look up table". Preferably the method of the present invention involves creating a model of the process having a hierarchical organization of the process phases. Such a model can be produced from, but is not limited to, the actual plant, a reduced scale physical model or an electronic simulation. The model can be based on empirical, semi-empirical or theoretically rigorous (ab initio) knowledge.

Using the model, a detection/reaction scheme can be applied wherein reactions to substantially all possibly detected yield and product qualities are precalculated and known.

Alternatively, the model can be used to calculate or identify a reaction scheme when a given yield and product quality is identified.

In accordance with the present invention there is provided a method for controlling at least one characteristic of a product of an industrial batch process. The method comprising the steps of creating a hierarchical knowledge tree describing the process. Following the creation of a knowledge tree a learning process occurs. This leads to the creation of a global model. During the execution of a batch process, the global model is applied to dynamically target subsequent phase parameters based on already executed phases.

Other objects and benefits of the invention will become apparent upon reading the following description taken in conjunction with the accompanying drawings.

It is noted that the terms automatic process control and advanced process control, used in this specification, are intended to be synonymous.

DETAILED DESCRIPTION OF THE EMBODIMENTS

The embodiments described herein are not intended to be exhaustive and to limit in any way the scope of the invention, rather they are used as examples for the clarification of the invention and for enabling of other skilled in the art to utilize its teaching.

Figure 2:
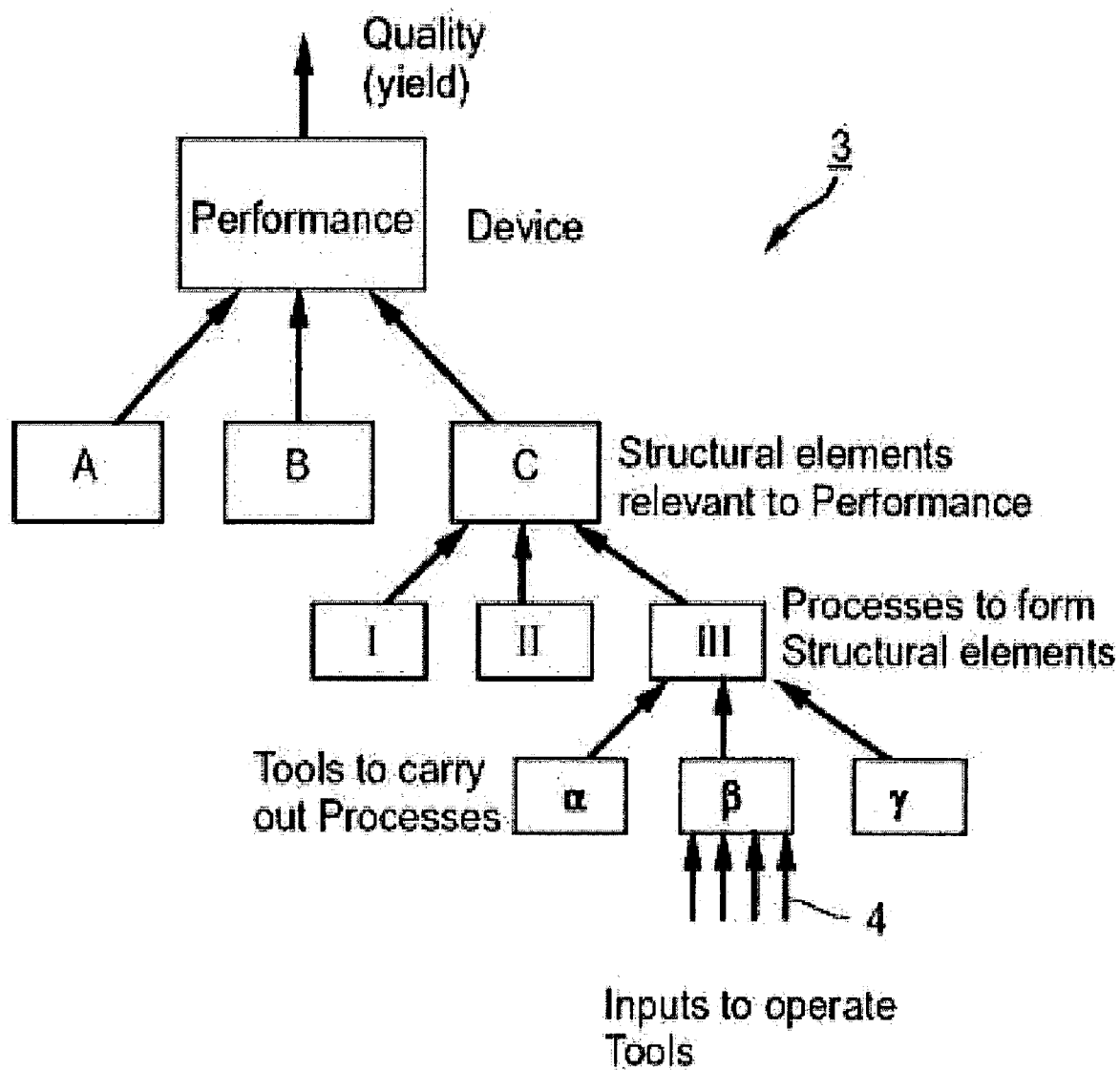
FIG. 2 shows a layout of manufacturing levels according to the present invention.

FIG. 2 depicts a scheme 3 useful to demonstrate an overview of the factors, which determine quality according to the conception of the present invention.

Quality, which resides at the top of a tree like structure, is assessed according to the performance of the product wherein "performance" may apply to any assessable attribute of the product (e.g., a speed of a transistor, the crispiness of a loaf of bread, the cost of production of the product, the quantity per hour of water desalinated in a desalination plant).

Performance depends on structural elements A, B, C of the product, which are usually formed in a chronological order in which e.g. element C is formed when elements A and B already exist.

Each structural element e.g. element C is formed by one or more sequential processes, each process e.g. process III, is carried out by at least one manufacturing tool, and each manufacturing tool e.g. tool β, has a plurality of inputs 4, which can be controlled.

Each object in FIG. 2 (an entity residing in a box) has a quantitative output (an arrow leaving the box), which is a function of the values of a respective plurality of inputs (arrow entering the box) to this object.

One of the ideas underlying the present invention is that a target output (a quantitative measure) of any object (an entity in a box) of the tree shown in FIG. 2 is automatically updated during manufacturing in order to achieve, taking into account the momentarily state of the product and the circumstances of the manufacturing process, an optimized favorable influence (an input) on another object which resides at a higher tree level.

In general, updating is carried out using a quantifier or model. The modeler may be an empirical modeler using empirical results or using a formula obtained from empirical results. Alternatively it may be a theoretical modeler, which is to say it uses a theoretical formula however obtained or theoretical results or a combination thereof. As a further alternative it may use expert-provided input.

The present invention is best explained by the way of a non-limiting example taken from the semiconductor industry.

The Device Level in Modular APC

Figure 3:
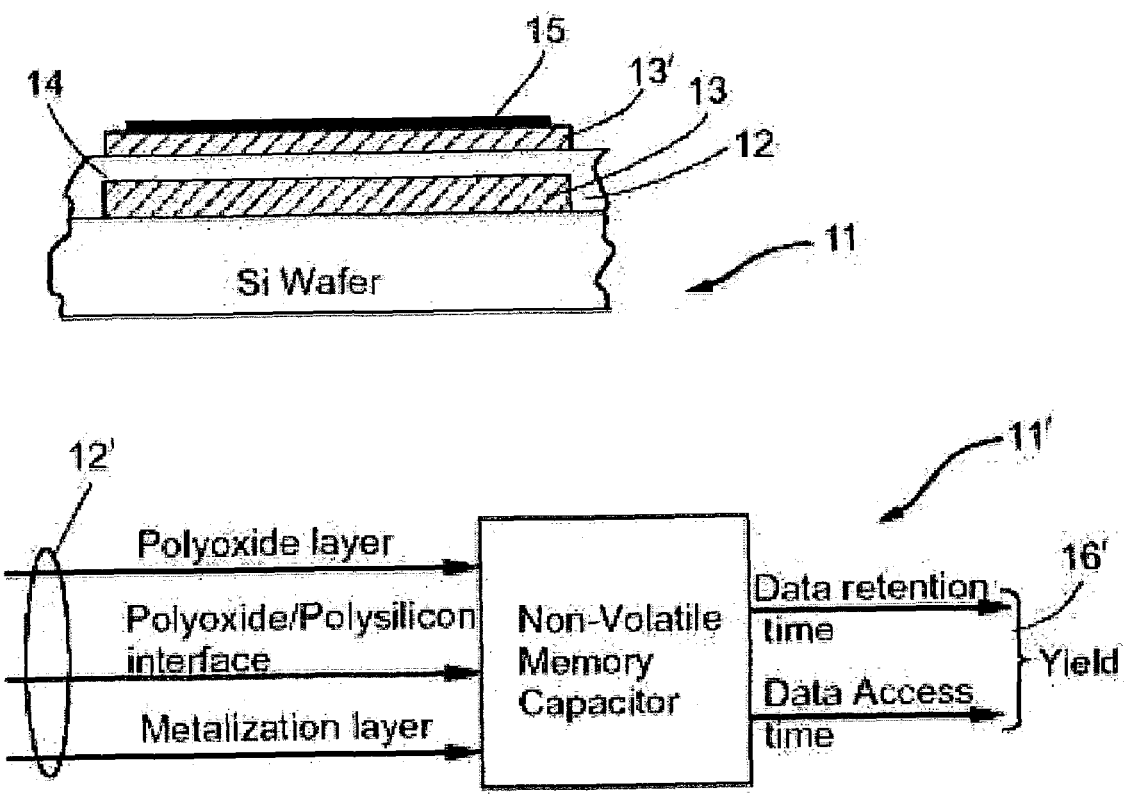
FIG. 3 shows the structure and the symbolization of a non-volatile memory capacitor.

FIG. 3 depicts a symbolization 11' of a manufactured electronic component e.g. a nonvolatile memory capacitor 11 made of a dielectric layer 12 of polyoxide (of silicon) sandwiched between two layers 13,13' of polysilicon ($n^+$ poly-Si).

The capacitor is the final product in a microelectronic fabrication facility whose manufacturing line is process controlled according to method of the present invention.

Assume that yield of the final product is assessed with respect to two electrical parameters of capacitor 11, which are shown as output 16' of interconnection cell 11': the data retention time and the access time of component 11.

As far as data retention time is concerned, it is known in the art that in order to obtain a longer data retention time for nonvolatile memories, polyoxide layers with low leakage current, high dielectric strength and high charge breakdown are required.

Besides polyoxide layer properties, data retention time is also affected by the surface morphology of bottom polysilicon layer 13 on which polyoxide 12 is deposited. This is so because a rough surface at polyoxide/polysilicon interfaces 14 results in high local electric field which cause the polyoxide layer to exhibit a higher leakage current and a lower dielectric break down field.

Hence, polysilicon layer 13 has to be polished and smoothened after its deposition before a deposition of polyoxide layer 12 can take place.

A factor which has an influence on the access time of capacitor 11 is e.g. the properties of metallization layer 15, which provides contact to polysilicon layers 13'.

To represent graphically the (theoretical and experimentally validated) influences of the aforementioned structural elements of the capacitor on the production yield of component 11, a graphical symbolization of capacitor 11 known as "Knowledge Tree (KT) map" is used.

KT, which is the subject of U.S. patent application entitled "A Method and Tool for Data Mining in Automatic Decision Making Systems", by Goldman, et al. filed Dec. 8, 2000 (hereinafter the KT Patent Application) is a model of relations among objects in terms of "cause and effect".

A KT map includes elements referred to as interconnection cells representing objects. The interconnection cells have inputs, which represent respective influential factors on relevant outputs of the object.

Thus, interconnection cell 11' of capacitor 11 has an output representing the performance parameters 16', and has a. group 12' of three inputs which consist of the following structural elements of the capacitor: "polyoxide layer", "polyoxide/polysilicon interface" and "metallization layer" all of which have influences on output performance parameters 16'.

As should be understood, the inputs to interconnection cell 11' are selected by an expert (physicist or an electrical engineer) who is familiar with the dependence of the performance of component 11 on its construction.

The procedure described above in which yield is translated through performance parameters into structural details, resides in what is referred to as "device level" of the APC and is an essential aspect of the present invention.

This is so because the structural elements are in turn, as shown below, outputs of the various process stages of the whole manufacturing process whose product quality is an aim of the present invention.

Suppose now that for some reason the polyoxide/polysilicon interface structural element fails to meet its designed specifications (a defect). This can occur whenever e.g. a CMP polishing tool (see below) needed to form this structural element does not operate properly.

In a conventionally process controlled production line the work piece with the defect will be thrown at this stage into wafers scrap. The device level APC according to this invention tries to "condition" the wafer for subsequent production stages in spite of the defect.

This revolutionary approach is based on the theoretical knowledge that a change of a features in another structural element e.g. polyoxide layer can compensate (with regard to performance) the effect of the unacceptable (per-se) polyoxide/polysilicon interface, (e.g. make the polyoxide layer thicker or denser).

However, such theoretical knowledge is not sufficient in order to overcome the problem. There is a need for a quantitative experimental model, which relates an output in terms of performance of the capacitor to possible combinations of input structural elements having a variety of properties (within reasonable limits).

An example of such a quantitative model is provided by what is referred to as a Process Output Empirical Modeler (POEM) (see below). Then according to the quantitative predictions of the model, when a wafer with a defect in structural element B (shown in FIG. 2) arrives to a workstation which forms structural element C, inputs to an apparently completely "remote" tool (with respect to structural element B), e.g. that of tool β (the CVD machine which deposit the polyoxide) are adjusted to modify structural element B by the exact amount which is needed (a thicker polyoxide film) to leave the resulting performance intact in spite the defect in structural element B.

The Tool Level of APC

Each member of input group 12' is formed by at least one manufacturing tools in one or more process stages. E.g. "polyoxide/polysilicon interface" 14 is an output of three consecutive stages; a chemical vapor deposition (CVD) of polysilicon layer 13 carried out by a first CVD machine, a following chemical mechanical polish (CMP) of deposited polysilicon layer 13 carried out by CMP machine, and CVD of a polyoxide 12 by a second CVD machine.

Figure 4:
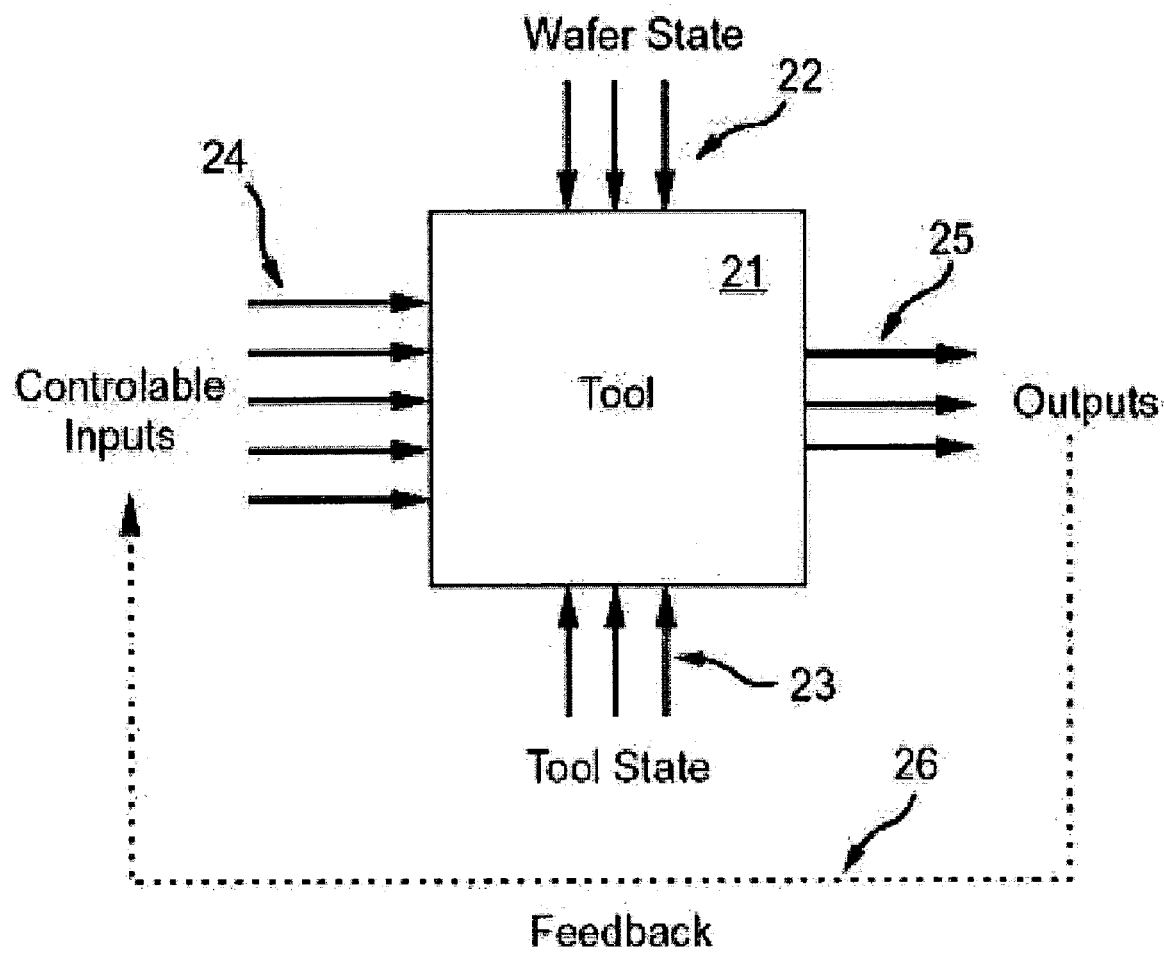
FIG. 4 shows an interconnection cell representing a tool of a process.

A method for advanced process control (APC) of a process performed by a single manufacturing tool, e.g. the CMP machine was detailed in the POEM Patent Application and its principles will be reviewed here in brief in conjunction with FIG. 4:

FIG. 4 shows an interconnection cell representing a (manufacturing) tool 21, e.g. a CMP machine to which a wafer in a certain wafer state 22, (e.g. having a certain thickness after being covered with a CVD layer of polysilicon) is introduced.

Tool 21 has its tool state 23 (e.g. pad life—the duration which the polishing pad of the machine is already in use), which influences the output of the CMP process although it cannot be controlled during an actual polishing of a wafer.

Such an influential input, which can be monitored but cannot be adjusted during a process, is referred to as a measurable input.

On the other hand interconnection cell of tool 21 has a group 24 of what is referred to as controllable inputs. These are operational parameters of the machine of the polishing process such as platen rotation speed, polishing time and retaining pressure on the wafer residing in the rotating platen, all of which can be changed automatically and independently within appropriate limits.

Outputs 25 of interconnection cell of tool 21 are e.g. thickness removed by the polish, thickness removal uniformity or wafer surface roughness, all of which have to be between the upper and the lower limits of the process output with optimal statistical attributes (sufficiently small standard deviation of the mean and of sigma).

All inputs, whether measurable or controllable, have quantitative attributes and are represented as vectors, each vector having a discrete value within reasonable boundaries.

For each incoming wafer having an arbitrary (discrete) value of its wafer state vector and which is polished on a CMP machine having a given (discrete) value of its tool state vector, a combination of favorable (discrete) values of the controllable input vectors is a priori assigned for the CMP machine operation in order to give an output with best statistical goodness.

This a priori assignment of a combination with favorable values of controllable inputs is referred to as feed-forward, and originates from the results of a preceding modeling based on learning (e.g. by trial and error) or existing knowledge with regard to the tool behavior.

In case that in spite the feed-forward assignment of controlled inputs, outputs deviates from specified boundaries, a feedback loop 26 is established automatically and the controllable inputs are adjusted in an optimized manner, to shift output towards target.

In the POEM Application the preceding modeling is accomplished by using what is referred to as a process output empirical controller. But other statistically correlating techniques between an output and a plurality of inputs such as: linear regression, nearest neighbor, clustering, classification and regression tree (CART), chi-square automatic interaction detector (CHAID), decision trees and neural network empirical modeling, can be used as well.

The Module Level of APC

The aforesaid advanced process control at a single tool level is known in the prior art. One main aspect of the invention is a combined process control of two or more stages in a process which are functionally coupled and carried out by two or more different manufacturing tools.

Such a combined process control shown in FIG. 4 to which reference is now made, is referred in the present invention as: module level advanced process control (module level APC).

Figure 5:
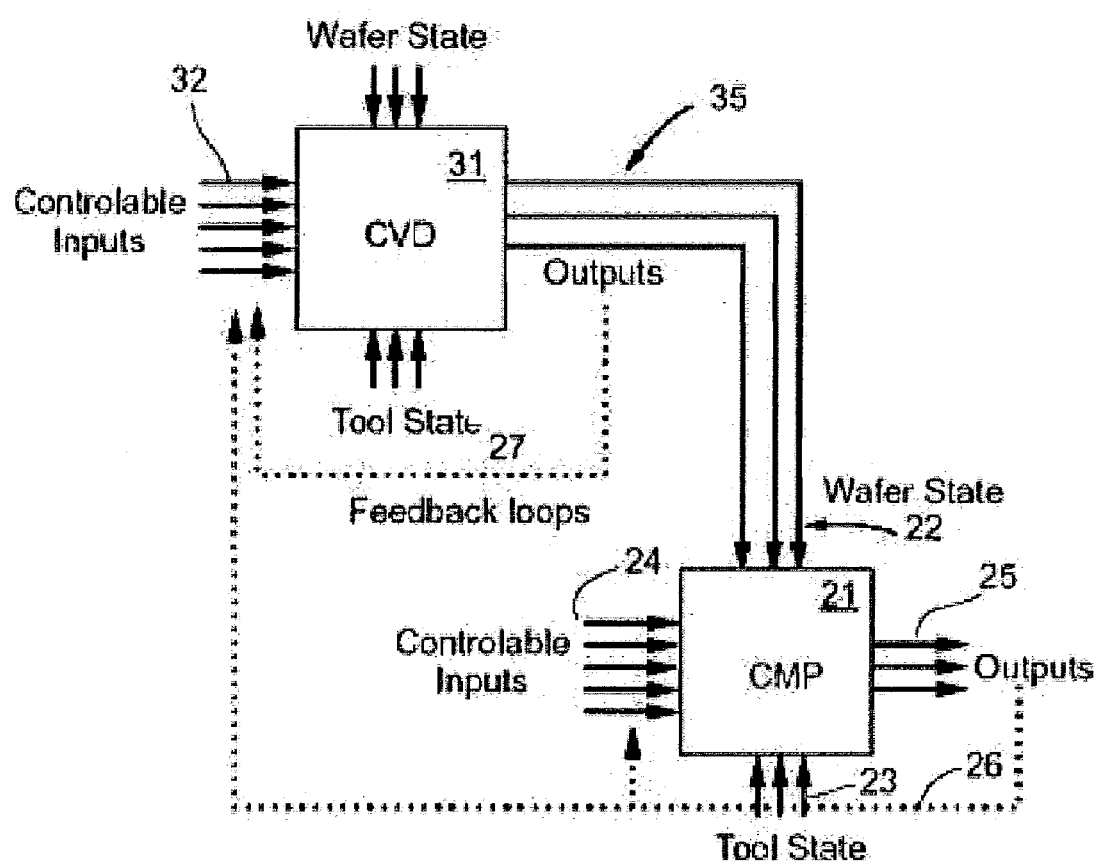
FIG. 5 shows two linked interconnection cells representing two tools in two linked processes.

FIG. 5 includes besides CMP machine 21 of FIG. 4, a CVD machine 31 whose output 35 according to our example is a polysilicon layer which is deposited on a silicon wafer (not shown) and which consist a wafer state input 22 to CMP tool 21.

Similarly to CMP machine 21 whose controls were detailed in conjunction with FIG. 4, CVD machine 31 has its peculiar controllable inputs 32; relevant to the present invention is the fact that outputs 35 of CVD machine 31 (e.g. polysilicon layer thickness and density) consist of inputs 22 to CMP machine 21.

Accordingly, a new situation arises in which inputs to CMP machine 21 lose one degree of freedom because wafer state 22 incorporates the CVD deposited polysilicon whose thickness is controlled by the CVD process. Thus output 25 of CMP tool 21 can be adjusted by controllable inputs 32 of CVD tool 31 in addition to controllable inputs 24 of CMP tool 21.

Accordingly CVD tool 31 has its autonomous feedback loop 27, however feedback loop 26 of output 25 of CMP tool 21 extends to affect also controllable inputs 32 of CVD tool 31.

It is now clear that disregarding momentarily the chronological order of the processes and the interrelations between tools, the final output of the process shown in FIG. 5 (i.e. a polysilicon layer having a thickness, a thickness uniformity and a surface roughness, all within specifications) is an outcome which depends on the first hand on the separate performance of each tool per-se.

However in the APC of the combined action of the CVD and the CMP tools, referred as to module level APC, the aforementioned final output is what matters.

Accordingly, CMP tool 31 can perform a "corrective action" to compensate for an unfavorable operation of CVD tool 21, while CVD tool 21 can take a "counter measure" to compensate for an anticipated deficiency performance of CMP tool 31.

Practically this is done by modeling quantitatively the effect, which each of the outputs of each of the tools has on the final output which results from the combined action of the tools.

This modeling, which is performed by a mechanism which is referred to as a modular POEM is best explained in conjunction to FIG. 5 to which reference is now made.

Figure 6:
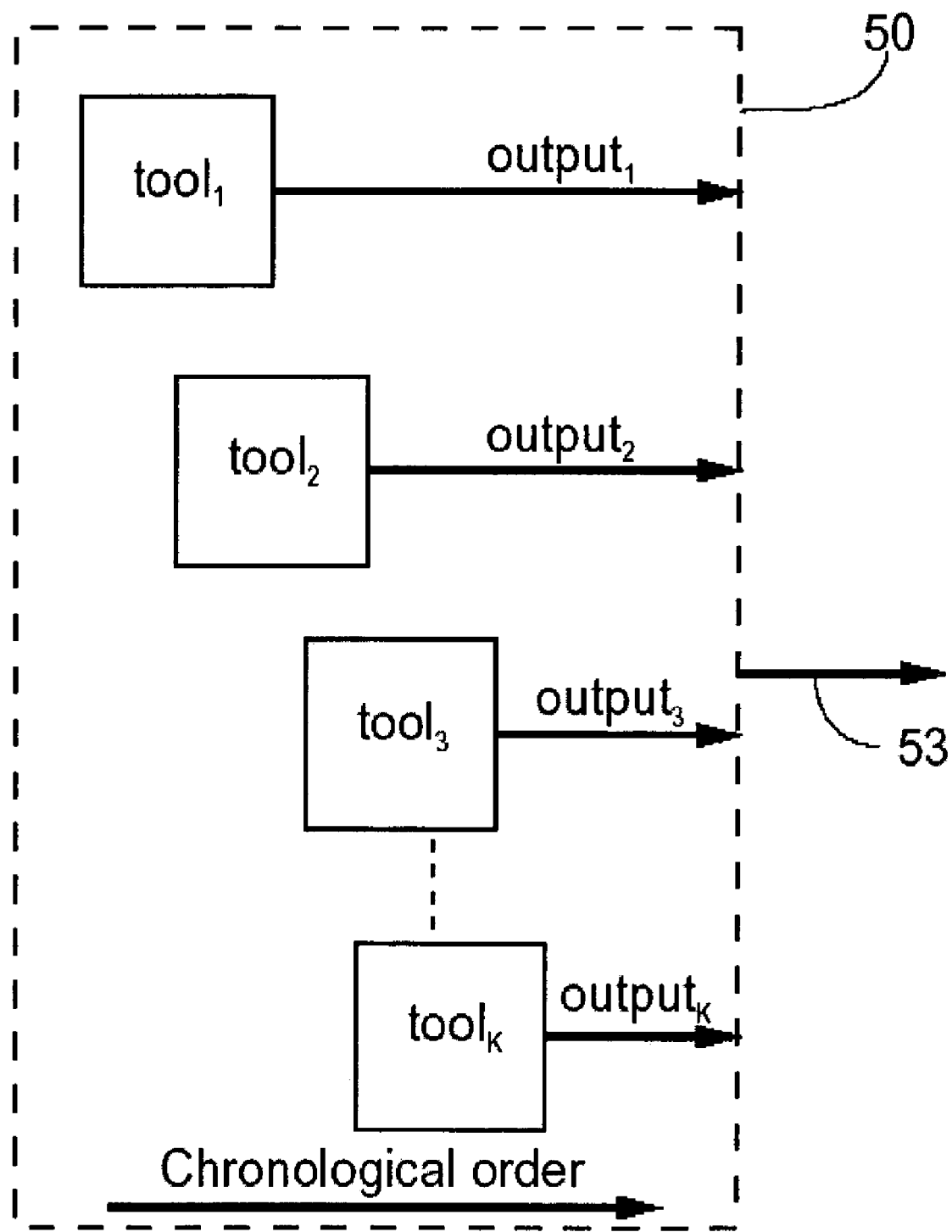
FIG. 6 shows elements in a modular tool process control.

FIG. 6 shows a plurality of tools, $tool_1$–$tool_k$ drawn according to their hierarchy (a term to be defined below) wherein their $output_1$–$output_k$ are input variables to a "virtual" modeler 50 whose output is a final output 53 of the combined process in which $tool_1$–$tool_k$ participate.

The algorithm and mechanisms of the modular POEM are identical to that of the POEM in the tool level which was detailed in the POEM Application (e.g. monitoring correlations between processes inputs and outputs, which provide raw data regarding output in response to various combinations of input values, statistical analysis of the acquired raw data and the providing of lookup tables), except for the fact that the input variables in the modular POEM consist of individual tools output rather than of tools controls as in the tool POEM.

Thus, for a target value of final output 53 the modular POEM looks for the most favorable combination of tools outputs, $output_1$–$output_k$ which results with that target value of final output 53 having the best statistical merits.

Once individual $output_1$–$output_k$ were assigned by the modular POEM as target outputs of the individual tools, the tool POEM of each tool "takes care" as described in the POEM Application, to choose the optimal operational controls of that tool depending on its tool state.

It will now be explained how the modular POEM optimizes the multi-tool process;

Suppose that each of $tool_1$–$tool_k$ has its respective designed target values and firstly, a wafer is coming out of $tool_1$ having a wafer state, which is represented by $output_1$ and which is determined by the actual performance of that individual tool. Then according to the aforementioned POEM terminology, the controllable input of the modular POEM ($output_1$ of $tool_1$) has changed into a measurable input. A new optimized combination of $output_2$–$output_k$ is preferably selected from the modular POEM lookup table together with the given $output_1$ to comply optimally with the target value of the final output 53.

The important point to observe is that during the aforementioned new optimized combination, new target values are assigned to the outputs of each one of the tools $tool_2$–$tool_k$ (although some of them may keep their former target values).

Now as the process advances and $tool_2$ affects the process, also $output_2$ will turn from a controlled input to the modular POEM into a measurable input and the number of controllable variables of the modular POEM will reduce to k–2. A new reassignment of target values to output of tools $tool_3$–$tool_k$ will take place and so on, where the degree of freedom to choose controllable inputs to the modular POEM drops by a unit each time a tool finished its roll in the multi-tool process.

A specific important case occurs e.g. in our example, when it is that output target of CVD tool 31 is adjusted according to output 25 of the subsequent CMP machine 21. That will happen when one is "preparing" the tools for the next wafer e.g. after learning according to observation of the previous wafer, that the CMP tool has a deficiency, which one would like the CVD tool to compensate in advance.

This is to say that in a combined process control according to the present invention it is possible that a target output of a first process is reassigned according to an output of a second process regardless the chronological order (or hierarchy) of the processes.

In a manufacturing line, a multiplicity of machines of the same type performs the same process on a plurality of wafers. It should be noted that it is the wafer which is the coupler between two tools i.e. CVD machine I is coupled to CMP machine J whenever a specific wafer goes from CVD machine I to CMP machine J. A moment later a new output wafer of CVD machine I may arrive to CMP machine K, coupling CVD machine I to CMP machine K and so on.

Thus, members of a tool couple in module level APC are dynamically interchanged during the production.

Another situation, which deserves addressing in the application of the module level APC arises when the throughput of the two coupled tools differs greatly.

Suppose that a CVD machine that consist of the first tool can accommodate a plurality of wafers (positioned on a rotating tray) in a single run, while a CMP machine which consist of the second tool can only handle a single wafer at a time.

Or conversely, a plurality of CMP machines in line, have to polish plurality of wafers preparing them to a film deposition which is carried out in a single run of a second CVD machine. In these cases production considerations dictate that several CMP machines in line have to polish in parallel the wafers output (or input) of a single run of a single CVD tool.

These situations usually consist of no problem according to the present invention (except for the fact that there may be a larger number of inputs to modeler 50), because the target values that are assigned to a tool does not depend on tool identity (among the group of tools which do the same function) or on the tool state, and each individual tool has its autonomous tool. POEM which takes care that the tool's controllable operational inputs comply with the target output value which was assigned to the tool by the modular POEM.

The Hierarchical Order of the Tools in the Process Module Level APC

So far, APC of one or more processes which are related to only one input (the polysilicon/polyoxide interface) of interconnection cell 11' in the device level of the example were considered. It should be evident that other inputs to interconnection cell 11' (such as e.g. the metallization layer) shown in FIG. 3 are associated with additional semiconductor manufacturing activities such as photolithography, ion implantation and wet or dry etching.

Such typical manufacturing stages in a semiconductor plant are physically and logically interrelated to each other, in a nested symbolization structure as displayed in the KT map of a larger manufacturing process shown in FIG. 6A to which reference is now made.

Figure 7B:
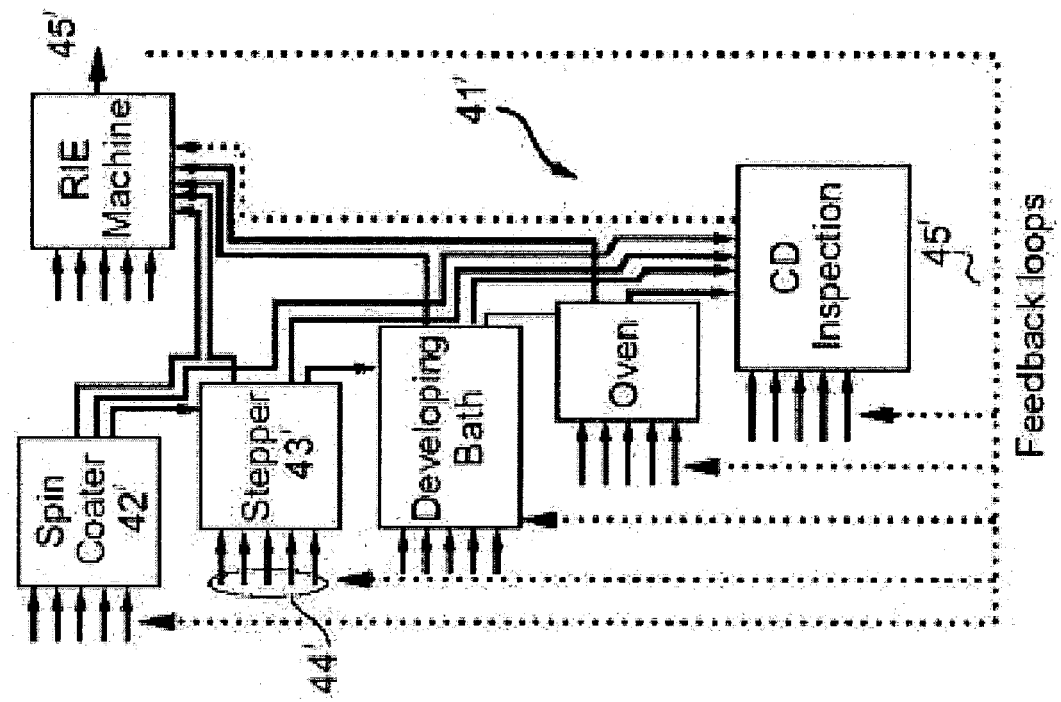
FIGS. 7A and 7B show the hierarchy structure of processes and tools in these processes respectively.
Figure 7A:
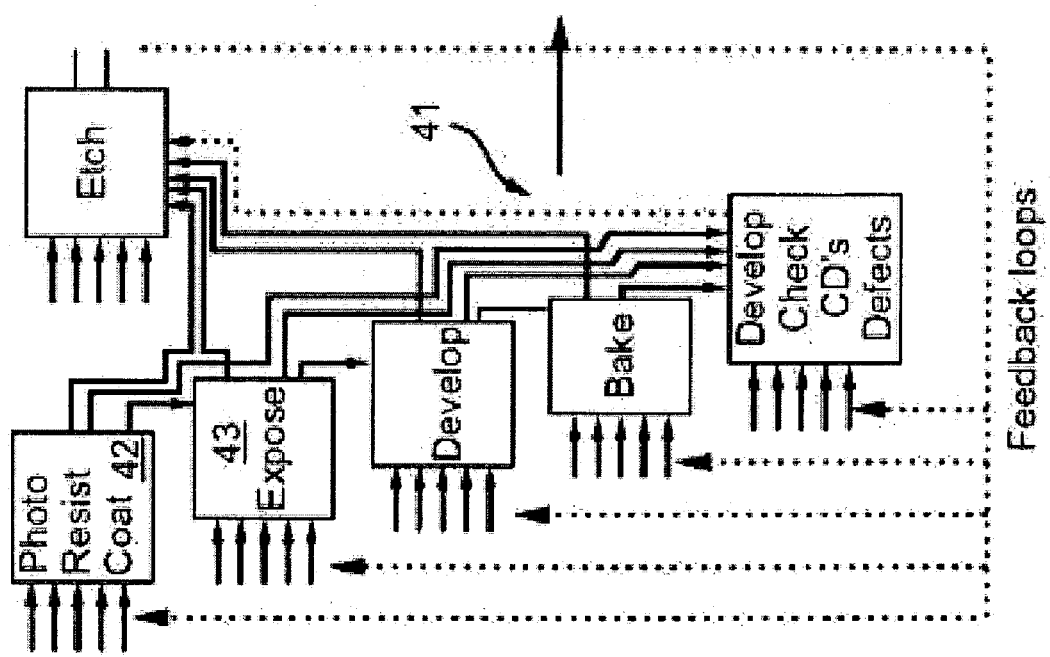
Figure 13:
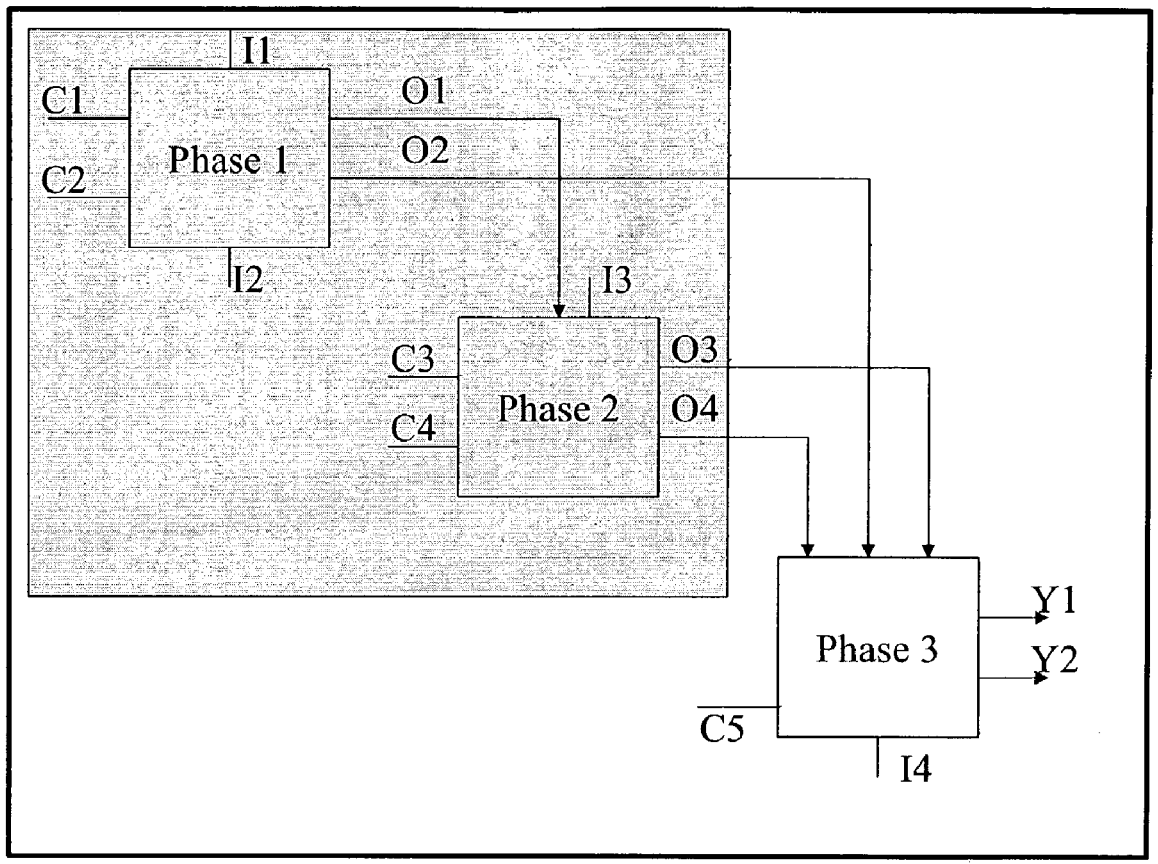
FIG. 13 shows the status of the present invention following the second phase of a batch process.

FIG. 7A shows a block 41 of the KT map whose description was detailed in conjunction with FIG. 13 of the Knowledge Tree Patent Application, and which includes the processes needed in order to apply a patterned metallization layer 15 (metallic contacts), having a geometric feature called desired critical density (CD), to polysilicon layer 13' of capacitor 11.

Each interconnection cell in KT map block 41 is associated with a manufacturing tool needed to accomplish the process represented by the respective interconnection cell.

This is shown in FIG. 7B to which reference is now made, e.g. interconnection cell 43 "expose" is associated with a stepper tool 43' which performs the exposure stage, while interconnection cell "photo resist coat" 42 is associated with a spin coater 42' which coats the wafer with photo resist.

Thus KT map block 41 has a corresponding image; a tool modular structure 41' in which each processing stage of KT map block 41 is replaced by its respective manufacturing tool.

FIG. 7B shows a modular structure, which includes a plurality of tools operated at a logically order in accordance with the KT map of the manufacturing. The APC of the contact critical density, which is an output of this multi-tool modular structure, is substantially a multiplication of the modular APC of a combined couple of tools, which was previously described.

The yield 45 of tool module 41' shown in FIG. 7B is assessed with respect to the critical density of the contact pattern, and all the controlled inputs of all the tools included in tool module 41' are enslaved either by feed-forward inputs e.g. as controlled input group 44' to stepper 43', or by a multiplicity of feedback loops 45', to achieve the target value of yield 45.

Accordingly, processes and tools have a hierarchical structure. The hierarchical score of processes is determined according to their chronological order. The later the process performed in the manufacturing, the higher is its ranking score. The tools are ranked according to the ranking of the processes, which they carry out, and a highly ranked tool is feeding back the controlled inputs of all the tools which are ranked lower.

On the other hand the higher the hierarchical ranking of a tool is, the higher is its "accumulated tolerance" i.e. the wafer which enters this tool has "utilized" the manufacturing tolerances of all the lower ranked tools with respect to the structural element which is formed by the module. Thus tolerance at this stage becomes marginally small, which "locks" the values of the apparently controlled input of that high ranked tool, converting these inputs into measurable inputs.

Figure 8:
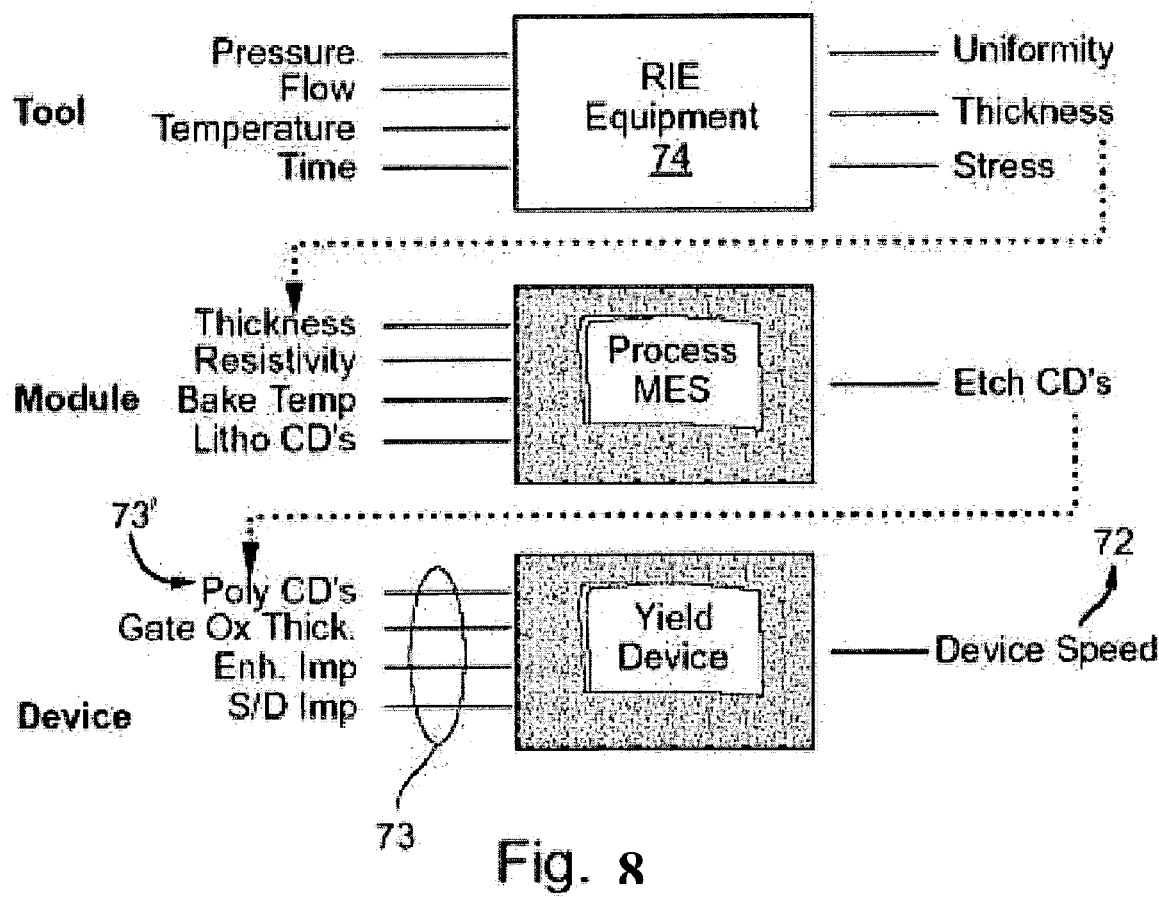
FIG. 8 shows three levels of process control according to the present invention.

FIG. 8 shows another example; the production of a field effect transistor (FET), whose controlled yield is assessed with respect to its rise time speed 72.

Device speed 72 depends on a group 73 of various structural elements, among them are metallic contacts applied to a gate oxide, having a multiple characteristic critical density, (Poly CD's, 73').

At least one process, usually more than one forms each structural element of group 73, and using at least one type of tools carries out each process.

E.g., contact CD is the final output of a sequence of several dedicated processes to produce metallic contacts, the final one of which is a reactive ion etching process performed by a reactive ion etching (RIE) machine 74 which is highest ranked among the tools included in a tool module of the machines needed for carrying out these sequence of processes.

Figure 9:
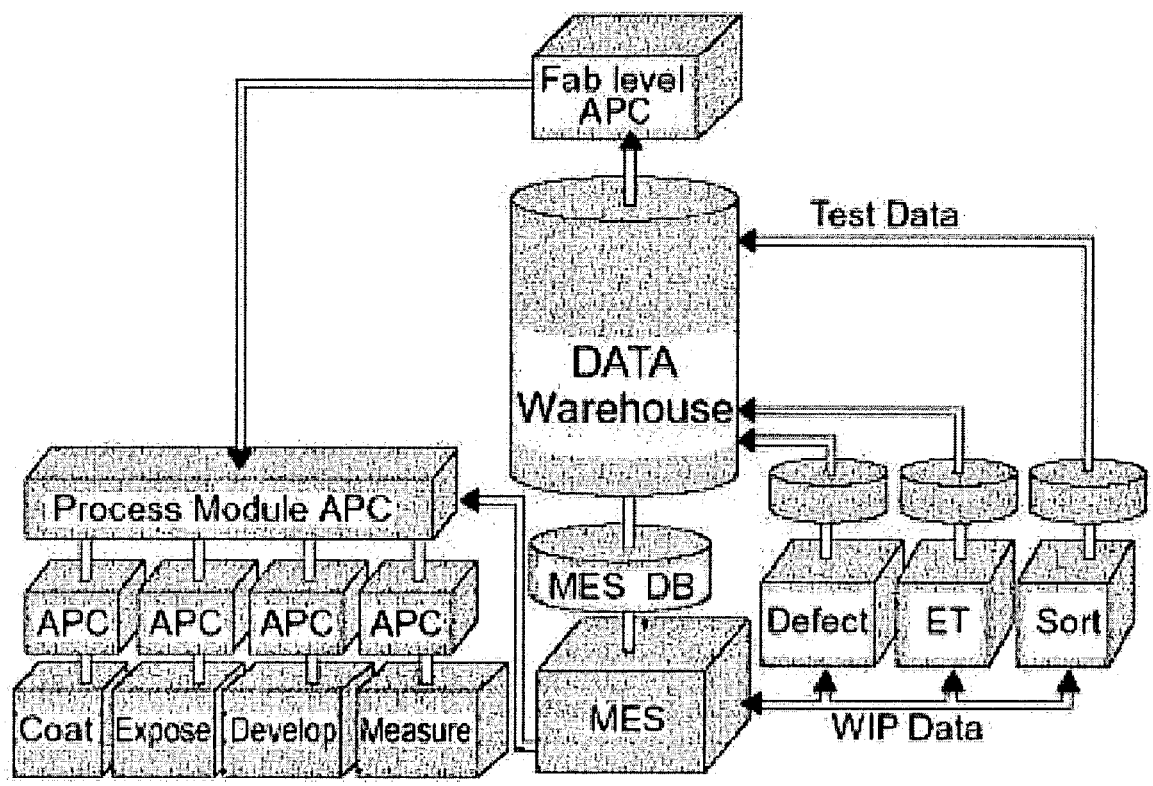
FIG. 9 shows the upper fabrication facility level of process control.

FIG. 9 shows a scheme of a total APC of the whole microelectronic manufacturing fabrication facility (Fab), wherein all data relevant to the manufacturing and evaluating of a product are stored in a Data Warehouse.

The Data base of the Data Warehouse includes include the lookup table of each tool, the updated tool state of each tool, the book-keeping of the wafer state of each wafer at each moment and the performance of each device produced on a wafer.

The APC algorithm of the present invention utilizes data supplied by hardware and software components, which are included in what is referred to as-yield enhancing system.

Figure 10:
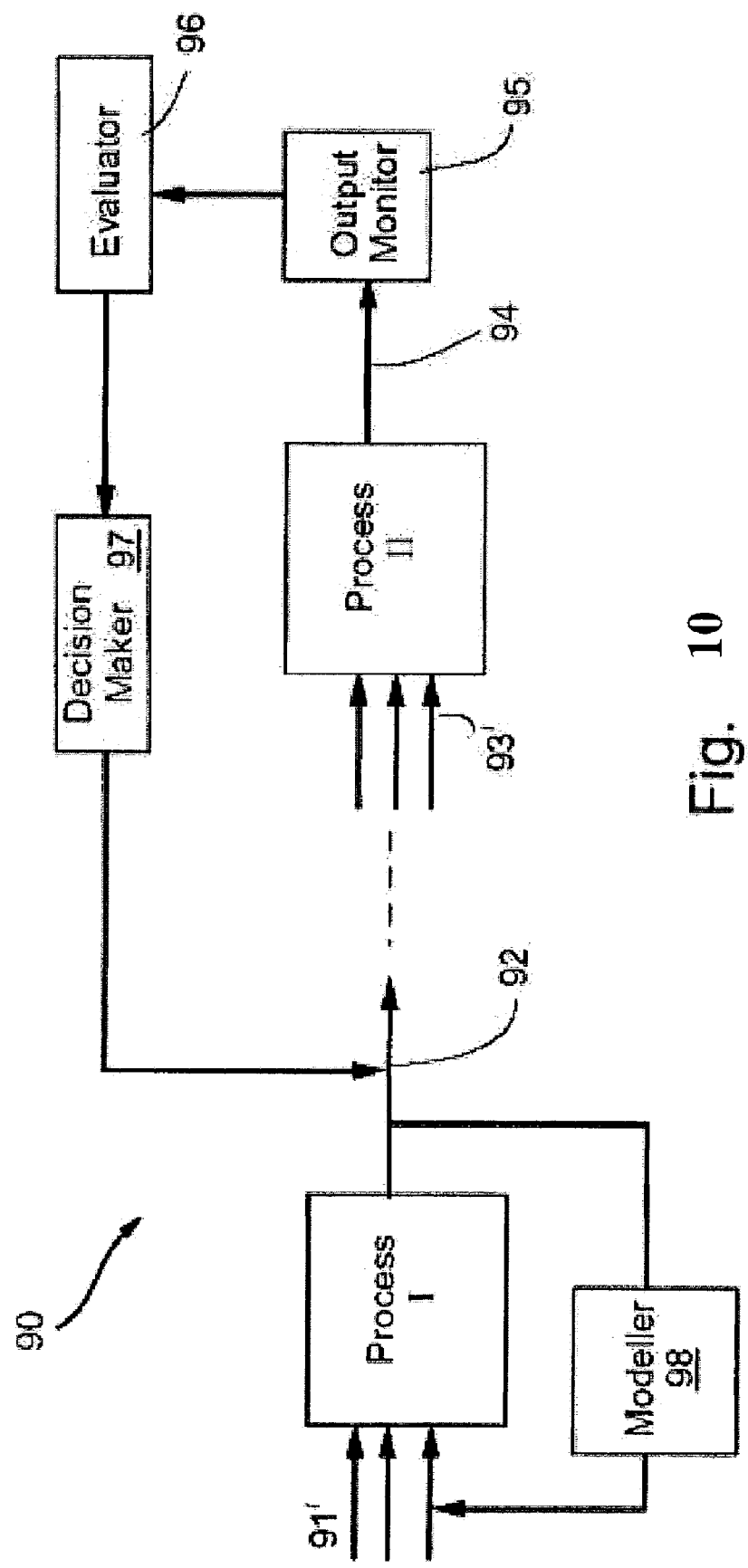
FIG. 10 shows a system for an integral process control according to present invention.

The yield enhancing system generally includes all the elements, which are included in the system for monitoring a process having a plurality of input parameters, which was described in the POEM Application, yet the yield enhancing system has its peculiar features which some of them are described in conjunction with FIG. 10 to which reference is now made.

Shown in FIG. 10; Process I has a target output 92, which is an influential factor on input 93' of process II. Process II has an output 94 whose value is monitored by output monitor 95 and is evaluated by output evaluator 96. Then, based on the evaluation score of the monitored output of process II, a new value is assigned to target output 92 of process I by an intelligent decision maker 97.

In order to meet the newly assigned target output 92, the respective value of input vector 91 are adjusted by experimental modeler 98.

The present invention can be applied to the improvement of batch processes such as described in S88. This is done by first creating a hierarchical knowledge tree of the process, then learning the process, creating a model and lastly by executing the created model using dynamic targeting.

Figure 1:
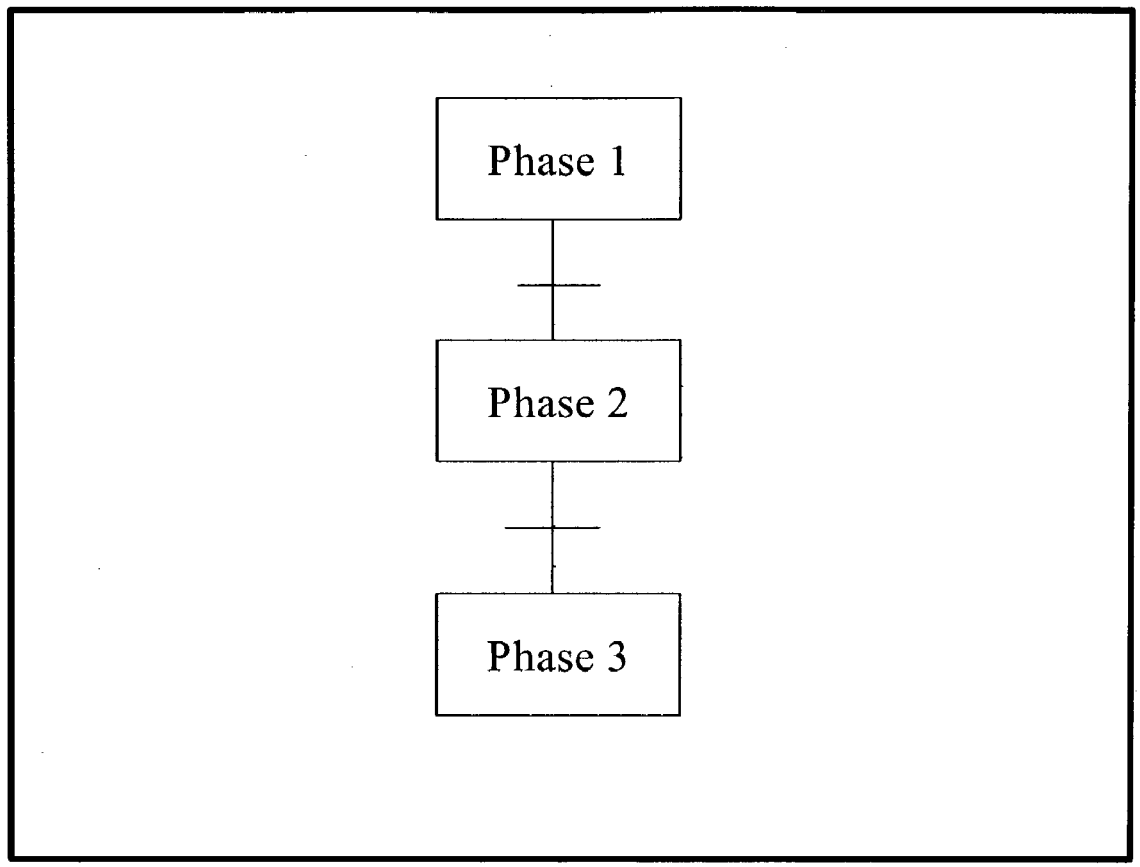
FIG. 1 shows a illustrates three phases of a batch system according to S88 methodology.
Figure 11:
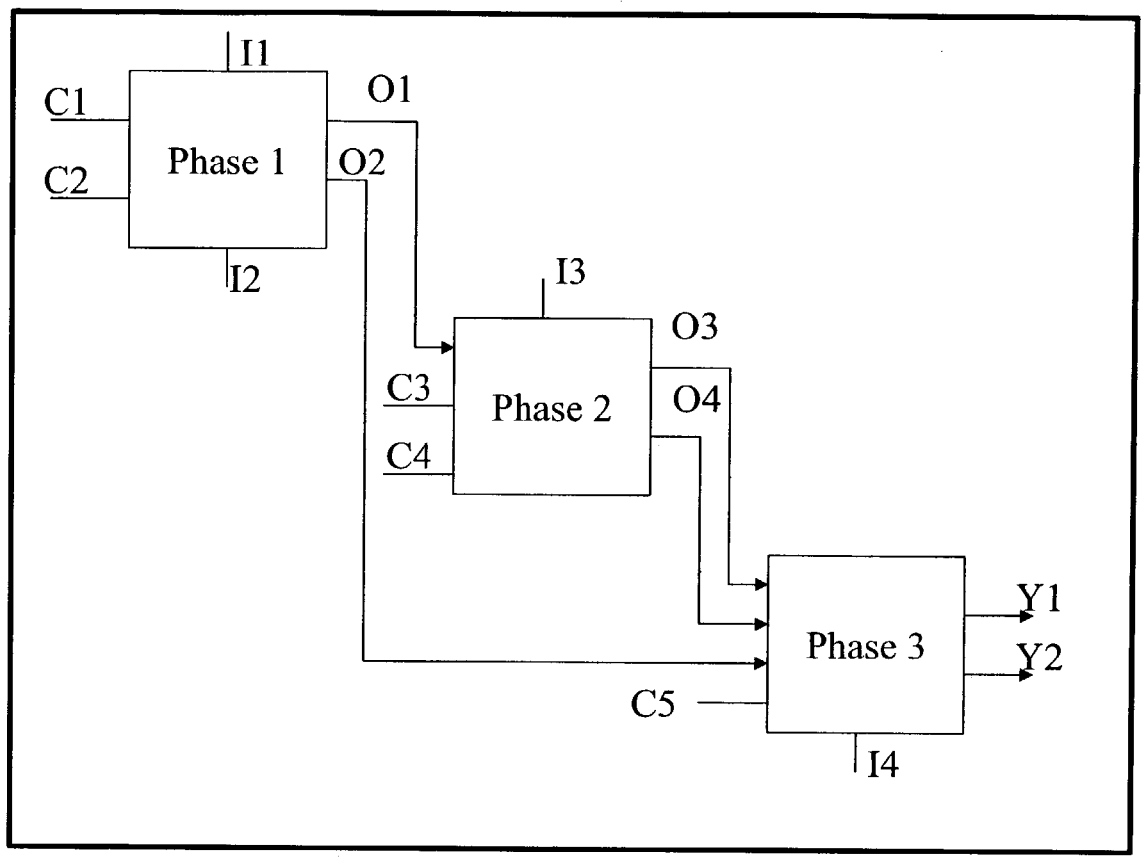
FIG. 11 shows three phases of a batch process depicted prior to the application of the present invention.

In FIG. 11, an example of a three phase batch recipe of the diagram depicted in FIG. 1 is depicted. Each phase is denoted by a box. Flow is from left to right. Inputs located at the upper side of a box (e.g. I1) denote variables related to the material being processed that can be measured but not manipulated. Inputs located at the lower side of a box (e.g. I2) denote variables related to the physical unit in which the phase is running that are measured but cannot be manipulated. Inputs located at the left side of a box are controlled inputs, i.e. inputs that can be manipulated by the control system. And finally, outputs are located at the right side of the boxes. Lines that connect one box to another one denote output from one phase, which are used as inputs for a subsequent phase. Finally, each box contains a transformation function, which describes how inputs are processed to outputs. Transformation function may be any type of function and include but are not limited to mathematical formula, list of rules or a neural net component.

The solution for a model is obtained recursively as follows. The products of the recipe depicted in FIG. 11 have target values for Y1 and Y2. Because phase 3 gets inputs from phase 1 and phase 2, the system has to solve phase 1 and phase 2 first. The solutions of phase 1 and phase 2 are then input to phase 3. If the solutions for Y1 and Y2 are not satisfactory, an iterative search process is activated that recursively solves phases 1, 2 and 3 until the target values for products Y1 and Y2 are achieved. During this process only controlled variables (e.g. C1, C2, C3, C4 and C5) are used to influence the results of Y1 and Y2, while measured inputs are taken as given. It is worth nothing that the recursive solution, which is described here, can be implemented by various techniques such as genetic algorithms, dynamic programming, or by solving a system of nonlinear equations.

Implementation of Predictive Control Using a Model that Supervises S88 Recipe Control S88 systems typically have a two-tiered architecture: a computer tier, in which a batch engine (BE) is run, and a PLC tier, in which hard logic is executed. For a process such as depicted in FIG. 1, the following control flow is applied. The BE is instructed (for example, by an operator or by a scheduler) to run the control recipe as described in FIG. 11. The BE downloads to the PLC an instruction to perform phase 1 including all the parameters related to phase 1 (C1, C2, I1 and I2). Once phase 1 has been reported as completed the BE reads the output values from the PLC and downloads instruction to the PLC to execute phase 2 including all the parameters related to phase 2 (O1, C3, C4 and I3). Once phase 2 has been reported as completed the BE reads the output values from the PLC and downloads instruction to the PLC to execute phase 3 including all the parameters related to phase 1 and phase 2 (O2, O3, O4, C5 and I4).

Based on the above described methodology of the present invention, a new approach for the monitoring and solving of S88 control recipes is described.

Prior to the downloading of phase 1 to the PLC, a models solver reads the current values of I1 and I2 from the BE. The models solver also reads the target values for Y1 and Y2. The models solver finds an optimal solution for the model (e.g. such as depicted in FIG. 1) by modifying controllable values (such as C1, C2, C3, C4 and C5). Once optimal values for the controllable variables are achieved these values are downloaded to the PLC as part of the recipe control. Mathematically the problem to solve is given by the following set of equations:

$$\text{Max } f(Y_1, Y_2, Y_1^T, Y_2^T) \qquad (1)$$

$$C_1, C_2, C_3, C_4, C_5$$

Given $$g_1(C_1, C_2, I_1, I_2) = O_1, O_2$$

$$g_2(O_1, O_2, C_3, C_4) = O_3, O_4$$

$$g_3(O_3, O_4, C_5) = Y_1, Y_2$$

where $g_1, g_2, g_3$ denote the transformation function of each phase respectively and $Y_1^T, Y_2^T$ denote the targets for the final outcomes as well. The function $f$ denotes the score function, which evaluate the whole process based on the distance of the actual outcomes from their targets and the level/cost of inputs added to the process.

Once the PLC reports that phase 1 has been completed the outcome values of phase 1 are read from the PLC. If the outcome values are exactly as predicted, there is no change in the recipe. If the outcome values differ from the predicted values, the models solver seeks a modified optimal solution for the model, as depicted in FIG. 12.

Figure 12:
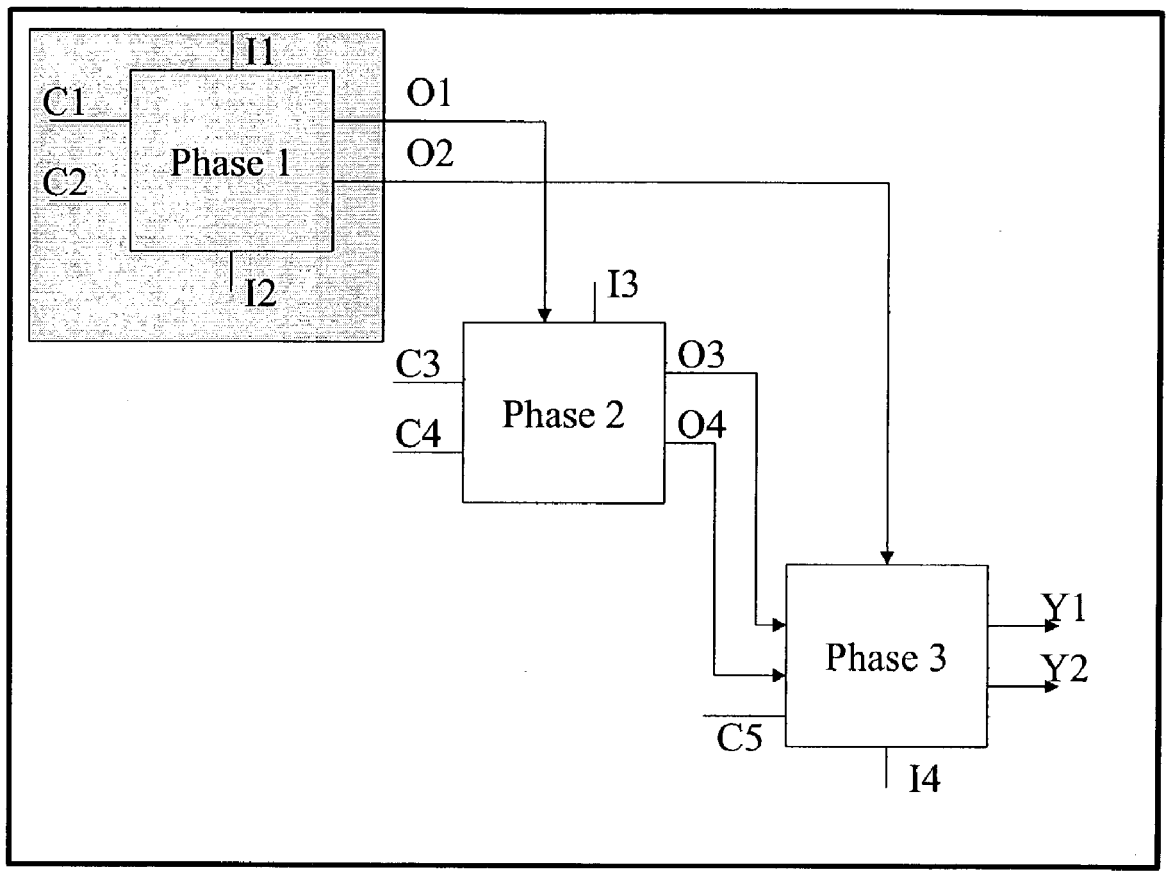
FIG. 12 shows the status of the present invention following the first phase of a batch process.

In FIG. 12, O1 and O2 are no longer manipulated variables. Since phase 1 has been completed (marked in gray area in FIG. 12) its outcome values O1 and O2 are constants and cannot be used as controllable values in the optimization process. Thus O2 is depicted as being connected to phase 3 from the top side of the phase 3 box and O1 is depicted as being connected to phase 2 from the top side of the phase 2 box indicating that these are measurable and not controllable variables. Mathematically the problem to solve is given by the following system of equations.

$$\text{Max } f(Y_1, Y_2, Y_1^T, Y_2^T) \qquad (2)$$

$$C_3, C_4, C_5$$

Given $$O_1 = O_1^A, O_2 = O_2^A$$

$$g_2(O_1, C_3, C_4) = O_3, O_4$$

$$g_3(O_2, O_3, O_4, C_5) = Y_1, Y_2$$

where superscript A denote actual. The calculated optimal values for the controllable are than downloaded to the PLC with the instruction to execute phase 2.

Once the PLC reports that phase 2 has been completed, the outcome values of phase 2 are read from the PLC. If these outcome values are exactly as predicted, there is no change in the recipe. If these outcome values differ from the predicted values the models solver seeks a modified optimal solution for the model, as depicted in FIG. 13.

O3 and O4 are no longer manipulated variables. Since phase 1 and phase 2 are completed (marked with gray area in FIG. 13) the respective outcome values are constants and cannot be used as controllable variables for the optimization of phase 3. Thus O2, O3 and O4 are connected to phase 3 from the topside of the phase 3 box indicating that these are measurable but not controllable variables. Mathematically, the problem to solve at this phase is given by the following set of equations.

$$\text{Max } f(Y_1, Y_2, Y_1^T, Y_2^T) \qquad (3)$$

$$C_5$$

Given $$O_1 = O_1^A, O_2 = O_2^A, O_3 = O_3^A, O_4 = O_4^A$$

$$g_3(O_2, O_3, O_4, C_5) = Y_1, Y_2$$

The calculated optimal values for the controllables are then downloaded to the PLC with the instruction to execute phase 3.

It is clear to one skilled in the art that application of the above described methodology increases the probability that a batch will be on target relative to prior art methodologies.

A Case Study

Figure 14:
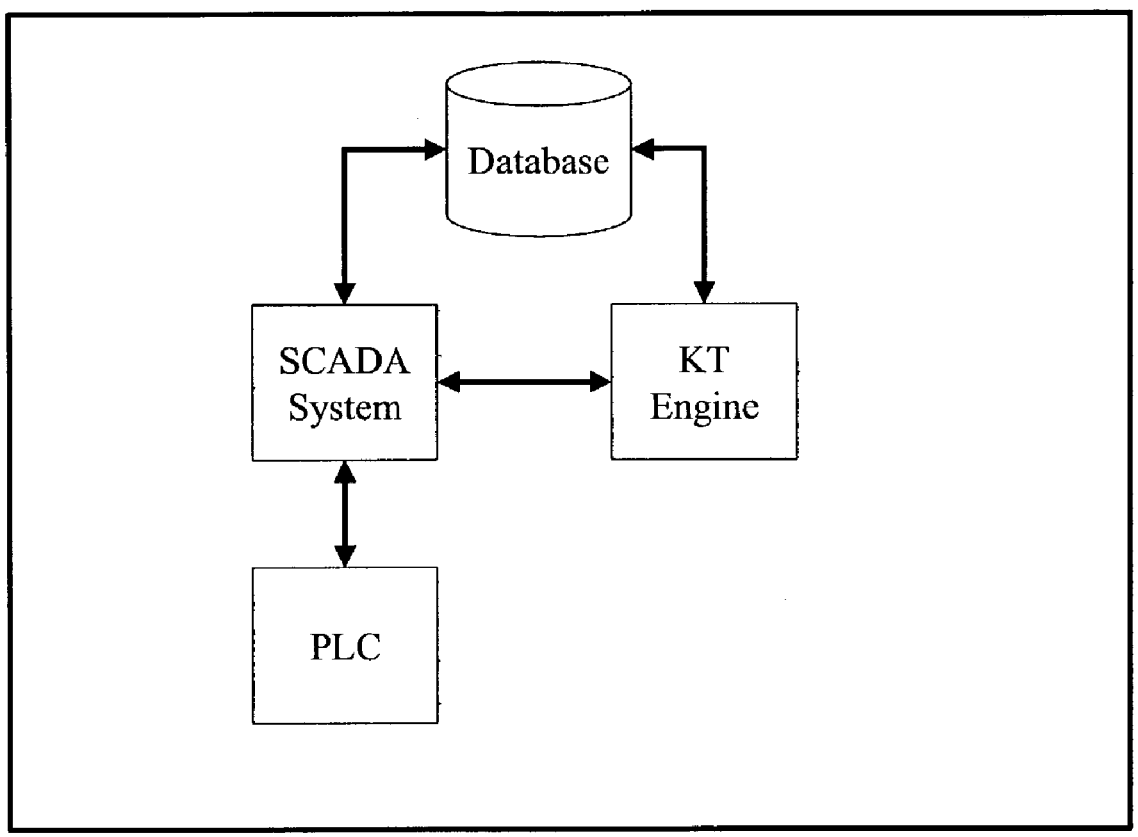
FIG. 14 illustrates a schematic diagram of the entire system according to present invention.

The following section describes a case study based on a project in which the above methodology has been implemented. FIG. 14 illustrates a schematic diagram of the system. A PLC monitors an industrial batch process in which wafers are processed in a three-phase process whose outcome is a specific wafer thickness.

Wafers are processed one by one. As a wafer enters the process, the original thickness of the wafer is determined at 22 regions arranged in a pattern of 7 concentric circles. Additionally measurements about the condition of the processing machine (such as polishing disk working hours, temperatures and pressures) are read and transferred to the models solver. The models solver optimizes a model in which the controllable variables are the pressure and working temperature of each of the seven circles. The models solver instructs the polishing PLC (programmable logic controller) to start a first polishing phase in which only a partial polish is performed. Once the first polishing phase is done, a second set of measurements is made. The models solver solves a second model, which takes into consideration the results of the first polishing phase. A second set of controlled variables (temperature, pressure and polishing time) is sent to the polishing PLC. Once this second phase is completed additional measurements are made in order to update the model based on the difference between the actual values achieved by the PLC and the predicted values calculated by the models solver. These differences are used to correct the model before a subsequent wafer is processed.

The invention described herein illustrates a new approach to targeting the outcomes of a batch in a S88 batch process control system. Using an inter-phase optimization technique, it is seen that the control parameters of a batch process are adjusted after each phase during the execution of a batch. Such an approach can be implemented in virtually any batch processing system regardless of its platform. A case study in which the teachings of the present invention have been applied has achieved a greater than 100% improvement in final product homogeneity. It should be noted that the benefits of the present invention are used not only within a single batch (as described above) but also from adjusting the prediction model used from batch to batch and lot to lot.

Figure 15:
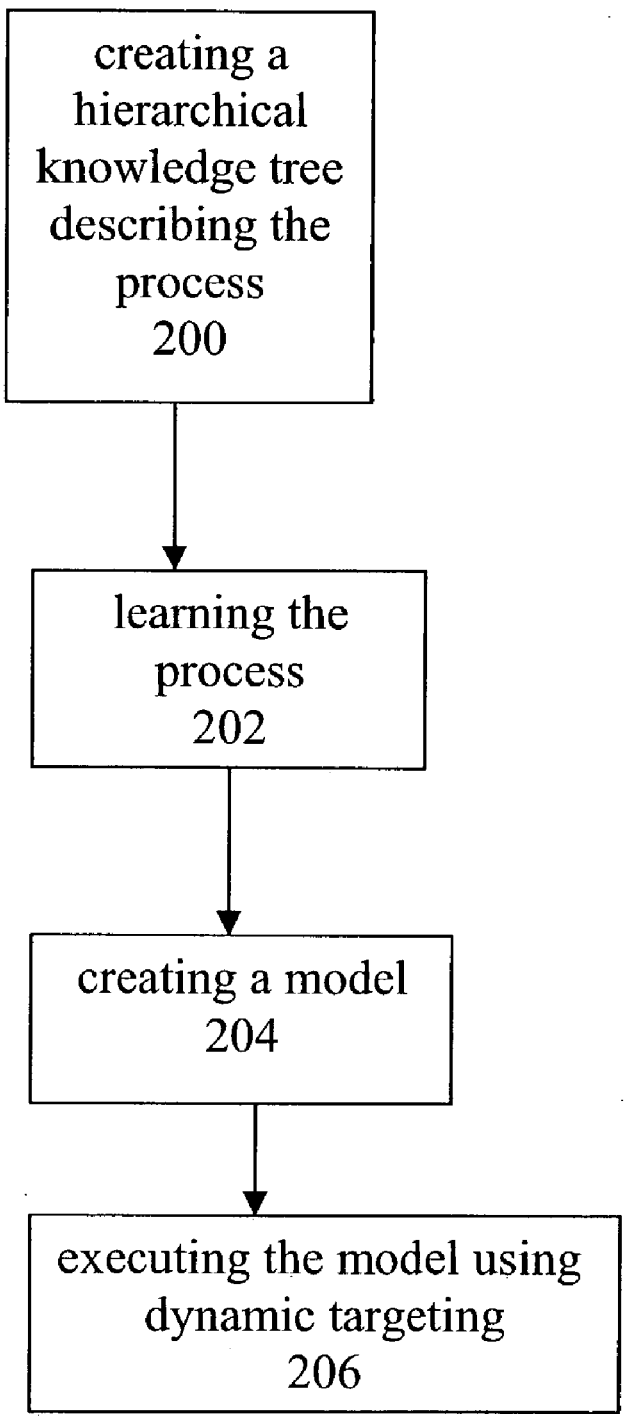
FIG. 15 illustrates a flow diagram of a method for controlling at least one characteristic of a product of an industrial batch process.

FIG. 15 is a figure of a method for controlling at least one characteristic of a product of an industrial batch process. In practice, initially a batch process such as producing wafers or manufacturing cheese is analyzed by the relevant domain experts who create a hierarchical knowledge tree which logically describes the process 200. At this stage, the knowledge tree is of a qualitative nature describing cause and effect relationships between the batch variables.

Following the creation of the knowledge tree, a quantitative learning process is applied 202 in order to create a quantitative model for each individual phase of the batch process. This learning process can be achieved through for example POEM, regression methods based on actual batch process data etc.

Using the knowledge tree structure a global batch process model is created 204 from the individual phase models. Now that a global batch process model exists actual batch process can be optimally executed using the dynamic targeting method 206. The dynamic targeting method is performed by modifying succeeding batch phase targets based on the outcomes (outputs) of already executed previous phases of the batch process. This dynamic targeting method is applied in order to optimize the global product characteristics of the batch process.

As a non-limiting example of the implementation of a preferred embodiment of the present invention the batch process of a biochemical product will be now described. A product is first synthesized in an early phase of the batch process and is then subsequently purified by using standard methods and operations. If the synthesis is inadequate and may generate a low yield, the subsequent purification would be modified in order to correct the first stage inadequacy.

The goal of optimization is to find the combination of the manipulated/controlled variables. The optimization process is dynamically reoptimized as the process moves forward whilst simultaneously at least some of the manipulated variables become measured (non-controlled) variables.

While the invention has been described with respect to a limited number of embodiments, it will be appreciated that many variations, modifications and other applications of the invention may be made without departing from the spirit and scope of the invention.

What is claimed is:

1. A method for controlling a quality of a product of an industrial batch process comprising the steps of:
   a) assigning the product a predetermined criteria with respect to a performance of the product;
   b) linking said performance to a feature of at least one structural element of the product; and
   c) associating said feature of said at least one structural element with at least one stage in the process which forms said at least one structural element wherein at least two said process stages are controlled by a modular process control;
   wherein at least one parameter of said industrial batch process is modified via said modular process control in at least one subsequent stage of said industrial batch process, said subsequent stage occurring during the same run of said industrial batch process, so as to allow said product to achieve said predetermined criteria.

2. A method for controlling a quality of a product of an industrial batch process as in claim 1 wherein said modular process control includes a process control selected from the group consisting of a semi-automatic process control and an automatic process control.

3. A method for controlling a quality of a product of an industrial batch process as in claim 2 wherein said automatic process control includes the use of a quantitative modeler.

4. A method according to claim 3, wherein said quantitative modeler is an empirical modeler.

5. A method according to claim 4, wherein said quantitative modeler comprises a theoretical modeler.

6. A method according to claim 3, wherein said automatic process control comprises use of expert-provided input.

7. A method for controlling a quality of a product of an industrial batch process as in claim 4 wherein said quantitative empirical modeler includes at least one statistical technique selected from the group consisting of linear regression, nearest neighbor, clustering, process output empirical modeling (POEM), classification and regression tree (CART), chi-square automatic interaction detector (CHAID), decision trees and neural network empirical modeling.

8. A method for controlling a quality of a product of an industrial batch process as in claim 1 wherein said product quality is assessed with regard to products selected from the group consisting of semiconductor devices and semiconductor components.

9. A method for controlling a quality of a product of an industrial batch process as in claim 8 wherein said performance includes electronic specifications of said product.

10. A method for controlling a quality of a product of an industrial batch process as in claim 1 wherein said steps are effected at a microelectronic manufacturing facility.

11. A method for controlling a quality of a product of an industrial batch process as in claim 1 wherein said at least one stage in a process is carried out with at least one tool, said process control of said at least one stage affecting an operation of said tool.

12. A method for controlling a quality of a product of an industrial batch process as in claim 11 wherein said at least one stage is carried out by at least one first tool and at least one second tool.

13. A method for controlling a quality of a product of an industrial batch process as in claim 12 wherein an output of said at least one first tool is a measurable input to said at least one second tool.

14. A method for controlling a quality of a product of an industrial batch process as in claim 13 wherein a throughput of said at least one first tool differs substantially than a throughput of said at least one second tool.

15. A method for controlling a quality of a product of an industrial batch process as in claim 12 further comprising controlling a controllable input of said at least one first tool according to an output of said at least one second tool.

16. A method for controlling a quality of a product of an industrial batch process as in claim 11 wherein said structural element is formed by at least one first process and at least one second process, further comprising relating said first process to said second process using a Knowledge Tree map, whereby elements representing factors which influence the quality of the product are represented within said knowledge tree map as interconnection cells having inputs, such that said knowledge tree map defines factors influential on relevant outputs of the respective processes.

17. A method for controlling a quality of a product of an industrial batch process as in claim 16 wherein an output of said at least one tool of said at least one first process is a measurable input to said at least one tool in said at least one second process.

18. A method for controlling a quality of a product of an industrial batch process as in claim 16 further comprising controlling a controllable input of said at least one tool in said at least one process according to an output of said at least one tool of said at least one said second process.

19. A method for controlling a quality of a product of an industrial batch process as in claim 16 wherein a throughput of said at least one tool of said at least one first process differs substantially than a throughput of said at least one tool in said at least one second process.

20. A method for controlling a quality of a product of an industrial batch process as in claim 11 wherein said at least one stage is carried out by at plurality of tools, each tool among said plurality of tools has a ranking score according to an hierarchy of said each tool in said manufacturing, the method further comprising the step of controlling a controllable input of a first said tool according to an output of a second said tool that has a higher said rank than said first tool.

* * * * *